United States Patent [19]

Price et al.

[11] Patent Number: 5,467,350
[45] Date of Patent: Nov. 14, 1995

[54] CONVERSION OF ISDN LAPB AND ISDN LAPD FRAMES

[75] Inventors: Steven Price, Overton; Raymond Jepson, Chandlers Ford; Barry J. Worley, Southampton; Steven P. Wood, Eastleigh; Andrew J. Keogh, Southampton, all of England

[73] Assignee: International Business Machines Corporation, Armonk, N.Y.

[21] Appl. No.: 90,584

[22] Filed: Jul. 13, 1993

[30] Foreign Application Priority Data

Jul. 22, 1992 [GB] United Kingdom ............... 9251841

[51] Int. Cl.⁶ ........................................... H04J 3/16
[52] U.S. Cl. ................... 370/82; 370/94.1; 370/99; 370/110.1
[58] Field of Search ................ 370/82, 77, 110.1, 370/94.1, 99, 84, 61

[56] References Cited

U.S. PATENT DOCUMENTS

| | | | |
|---|---|---|---|
| 4,597,074 | 6/1986 | Demichelis et al. | 370/99 |
| 4,607,364 | 8/1986 | Neumann et al. | 370/110.1 |
| 4,755,992 | 7/1988 | Albal | 370/94.1 |
| 4,943,978 | 7/1990 | Rice | 370/99 |
| 5,012,470 | 4/1991 | Shobu et al. | 370/110.1 |
| 5,048,012 | 9/1991 | Gulick et al. | 370/77 |
| 5,341,492 | 8/1994 | Sakata | 370/82 |

FOREIGN PATENT DOCUMENTS

| | | | |
|---|---|---|---|
| 0503207A1 | 9/1992 | European Pat. Off. | H04L 29/06 |
| 2224621 | 9/1990 | United Kingdom | H04L 11/00 |

*Primary Examiner*—Douglas W. Olms
*Assistant Examiner*—Shick Hom
*Attorney, Agent, or Firm*—Bruce D. Jobse; Andrew J. Dillon

[57] ABSTRACT

An apparatus and method for transmitting X.25 communications over the D-channel of an ISDN link. This is achieved by terminal adapters connected between an X.25 terminal and an ISDN connection which contain converters to convert X.25 LAPB frames into LAPD frames and vice versa. The conversion process involves directly copying fields from the incoming LAPB frame into a LAPD frame with the minimum amount of verification. Essentially the only checking performed is to examine the number of octets in each field of the incoming frame to ensure that the conversion process itself does not fall down.

11 Claims, 4 Drawing Sheets

| BIT POSITION | 1 | 2 | 3 | 4 | 5 | 6 | 7 | 8 |
|---|---|---|---|---|---|---|---|---|
| COMMANDS | 1 | 0 | 0 | 0 | 0 | 0 | 0 | 0 |
| RESPONSES | 1 | 1 | 0 | 0 | 0 | 0 | 0 | 0 |
*Fig. 3*
| BIT POSITION | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| | EA | C/R | | | SAPI | | | | EA | | | | TEI | | | |
*Fig. 4*
| BIT POSITION | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| I FORMAT | 0 | | | N(S) | | | | | P | | | | N(R) | | | |
| S FORMAT | 1 | 0 | S | S | X | X | X | X | P/F | | | | N(R) | | | |
| U FORMAT | 1 | 1 | M | M | P/F | M | M | M | | | | | | | | |
*Fig. 5*
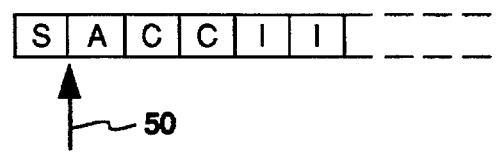
*Fig. 6A*
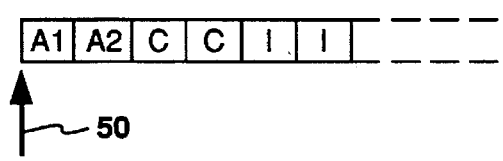
*Fig. 6B*

CONVERSION OF ISDN LAPB AND ISDN LAPD FRAMES

FIELD OF THE INVENTION

The present invention relates to a system and method for the conversion of ISDN LAPB frames into ISDN LAPD frames and vice versa.

BACKGROUND OF THE INVENTION

Integrated Services Digital Network (ISDN) is a set of internationally agreed standards specified in the so-called "Blue books" of the International Telegraph and Telephone Consultative Committee (CCITT). ISDN allows voice, data and other applications to communicate over wide bandwidth telephone networks. Essentially ISDN defines a series of layers in a system as well as the interfaces between these layers, through which voice or data can be passed from an application program onto the network and vice versa. Further information about ISDN can be found in e.g. "ISDN Explained" by J Griffiths (Wiley, 1990).

A standard or basic rate ISDN link comprises three channels: one "D-channel" with a data rate of 16 kbits s-1, and two "B-channels", each with a data rate of 64 kbits s-1. The two B-channels are essentially at the user's disposal to send information down, whilst the D-channel is used for signalling—e.g. setting up and finishing calls. Often however signalling does not require the full 16 kbits s-1 capacity of the D-channel, and it is possible to use this spare bandwidth on the D-channel to transmit extra information. CCITT recommendation Q.921 defines a special frame format for use on the D-channel, the Link Access Procedure-D (LAPD). All communication on the D-channel, whether signalling or data transmission, must be in LAPD format.

Another CCITT digital communications standard is X.25. This has its own frame format, known as LAPB ("Link Access Procedure—Balanced"), as well as a physically different socket connection from ISDN. X.25 transmission lines typically have a bandwidth of 9.6 kbits s-1. Recommendation X.31 of the Blue Books discusses the possibility of transmitting signals from an X.25 terminal into an ISDN link, allowing both X.25 and ISDN systems to be used whilst only maintaining a single type of connection (see also "ISDN explained", p107). Recommendation X.31 proposes a terminal adapter which intercepts frames from an X.25 system, and converts them into ISDN format for transmission over an ISDN link. A second terminal adapter could be used if necessary to convert the received frames back into X.25 format (depending on the nature of the telephone network being used), with the ISDN part of the link being transparent to the X.25 systems.

It is desirable to be able to transmit the X.25 frames over both the B-channel and the D-channel. The former is relatively simple, because the network allows any format to be used on the B-channel, but there is a problem with the latter in that only LAPD frames may be used on the D-channel, whereas the X.25 frames are in LAPB format. The terminal adapter therefore needs to be able to convert LAPB frames into LAPD, and vice versa at the receiving end. Recommendation X.31 suggests that this conversion can be performed by full link layer termination, but this requires a considerable amount of processing and is therefore relatively slow (the conversion is performed not in the link layer but in the packet layer instead, so that two logical links must be supported). Recommendation X.31 (section 7.4.2.2) also mentions the possibility of directly mapping from LAPB into LAPD but does not describe how this might be achieved.

SUMMARY OF THE INVENTION

Accordingly, the invention provides a method of converting an ISDN LAPB frame to an ISDN LAPD frame comprising the steps of:

discarding any input frames containing less than two octets;

examining the address field of the LAPB frame to determine whether it is a COMMAND or RESPONSE;

building an address field for the LAPD frame, and setting the COMMAND/RESPONSE bit in accordance with the address field of the LAPB frame;

examining the control field of the LAPB frame to determine the length of the control field, and discarding the frame if the determined length of the control field is two octets and the total length of the frame is two octets, else copying the control field directly from the LAPB frame to the LAPD frame; and copying the fourth and any further octets directly into the information field of the LAPD frame.

The main object of the invention is to provide a very fast yet reliable conversion from LAPB frames to LAPD frames and vice versa. Speed is obtained by performing the minimum checking of the contents of fields, allowing a subsequent processing stage to take appropriate action if these are incorrect. Thus the basic premise is that the frames are valid. However, the conversion process does verify field lengths so that if the frame is found to be too short to contain the specified control and address fields it is discarded. This stops the conversion process from looking for fields or octets that are not present, and so prevents the conversion process itself from crashing. This degree of reliability is essential because before any systems are allowed to be connected to a network, they are extensively tested by the network provider to verify that they conform to specifications and will not damage the network (this testing is known as homologation). The conversion process must therefore be robust enough to handle any possible errors in the signals. However it is not the function of the converter to try to correct frames. An invalid frame received as input will either be discarded or output as an invalid frame, allowing other appropriate sections to process the error.

In a preferred embodiment the frame is discarded as invalid if in the step of examining the address field of the LAPB frame, the address field does not match the pattern for either a RESPONSE or a COMMAND. In other words, the whole octet of the address field is checked against predetermined bit patterns corresponding to a RESPONSE or COMMAND. As an alternative it would be possible just to look at the one bit position in which a RESPONSE and a COMMAND differ (i.e. bit position 2—see FIG. 3 below). However, in practice it is almost as efficient to operate on whole bytes rather than individual bits.

Copying the fourth octet and above can either be performed directly (i.e. starting at the fourth octet), or by copying all octets after the end of the control field. For valid frames these two approaches would have the same result, but the former approach probably requires less processing. In a preferred embodiment the length of the control field is determined by examining the first two bits of the control field. It would also be possible to determine the frame format from these two bits, discarding frames longer than three octets that are not information frames, but the extra processing required to avoid copying such invalid frames is unlikely to be justified.

In a preferred implementation the method further comprises the steps of storing the incoming LAPB frame in a buffer, with a pointer to the start of the frame and a spare octet at its header;

overwriting the spare octet and address field of the LAPB frame with the LAPD address field from said building step; and decrementing said pointer by one octet and incrementing the length of the frame by one octet.

This implementation provides an efficient conversion method which allows the control and information fields to be copied directly from the input to the output frames with the minimum of writing.

The invention also provides a method of converting an ISDN LAPD frame to an ISDN LAPB frame comprising the steps of:

discarding any input frames containing less than three octets;

examining the address field of the LAPD frame to determine whether it is a COMMAND or RESPONSE;

setting the address field for the LAPB frame to the COMMAND or RESPONSE value in accordance with the address field of the LAPD frame;

examining the control field of the LAPD frame to determine the length of the control field, and discarding the frame if the determined length of the control field is two octets and the total length of the frame is three octets, else copying the control field directly from the LAPD frame to the LAPB frame; and copying the fifth and any further octets directly into the information field of the LAPB frame.

Again, a preferred implementation further comprises the steps of:

storing the incoming LAPD frame in a buffer, with a pointer to the start of the frame;

overwriting the second octet in the address field of the LAPD frame with the LAPB address field from said building step; and incrementing said pointer by one octet and decrementing the length of the frame by one octet.

The invention further provides a system for converting an ISDN LAPB frame to an ISDN LAPD frame comprising:

means for discarding any input frames containing less than two octets;

means for examining the address field of the LAPB frame to determine whether it is a COMMAND or RESPONSE;

means for building an address field for the LAPD frame, and setting the COMMAND/RESPONSE bit in accordance with the address field of the LAPB frame;

means for examining the control field of the LAPB frame to determine the length of the control field, and discarding the frame if the determined length of the control field is two octets and the total length of the frame is two octets, else copying the control field directly from the LAPB frame to the LAPD frame; and means for copying the fourth and any further octets directly into the information field of the LAPD frame.

The invention also provides a corresponding system for converting an ISDN LAPD frame to an ISDN LAPB frame comprising:

means for discarding any input frames containing less than three octets;

means for examining the address field of the LAPD frame to determine whether it is a COMMAND or RESPONSE;

means for setting the address field for the LAPB frame to the COMMAND or RESPONSE value in accordance with the address field of the LAPD frame;

means for examining the control field of the LAPD frame to determine the length of the control field, and discarding the frame if the determined length of the control field is two octets and the total length of the frame is three octets, else copying the control field directly from the LAPD frame to the LAPB frame; and means for copying the fifth and any further octets directly into the information field of the LAPB frame.

BRIEF DESCRIPTION OF THE DRAWINGS

An embodiment of the invention will now be described by way of example with reference to the following drawings:

FIG. 3 shows a LAPB address field;

FIG. 4 shows a LAPD address field;

FIG. 5 shows a LAPB/LAPD control field;

FIGS. 6A and 6B show the form in which the incoming frames are buffered;

DETAILED DESCRIPTION

Figure 1:
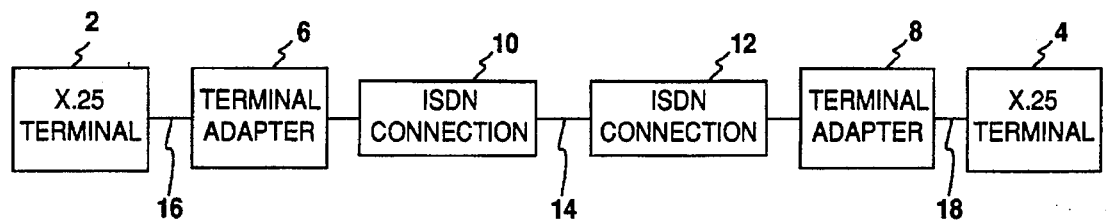
FIG. 1 is a diagram schematically illustrating the use of an ISDN link for X.25 communications.

FIG. 1 illustrates the principle of communications between two X.25 terminals 2, 4 using an ISDN link 14. The X.25 terminals are typically pre-existing systems and to update them directly for ISDN would be complicated and expensive, requiring rewriting software as well as hardware modifications. Therefore connected to each end of the ISDN link is a terminal adapter 6, 8 which allows the X.25 terminals to communicate over the ISDN link. Conceptually, each terminal adapter has an X.25 connection 16, 18 on one side for communication with the X.25 terminal, and an ISDN connection 10, 12 on the other side for communication with the ISDN link. In order to send X.25 signals over the ISDN D-channel, a terminal adapter is required to convert LAPB frames into LAPD frames before transmission, and back into LAPB frames at the other end of the link.

Figure 2:
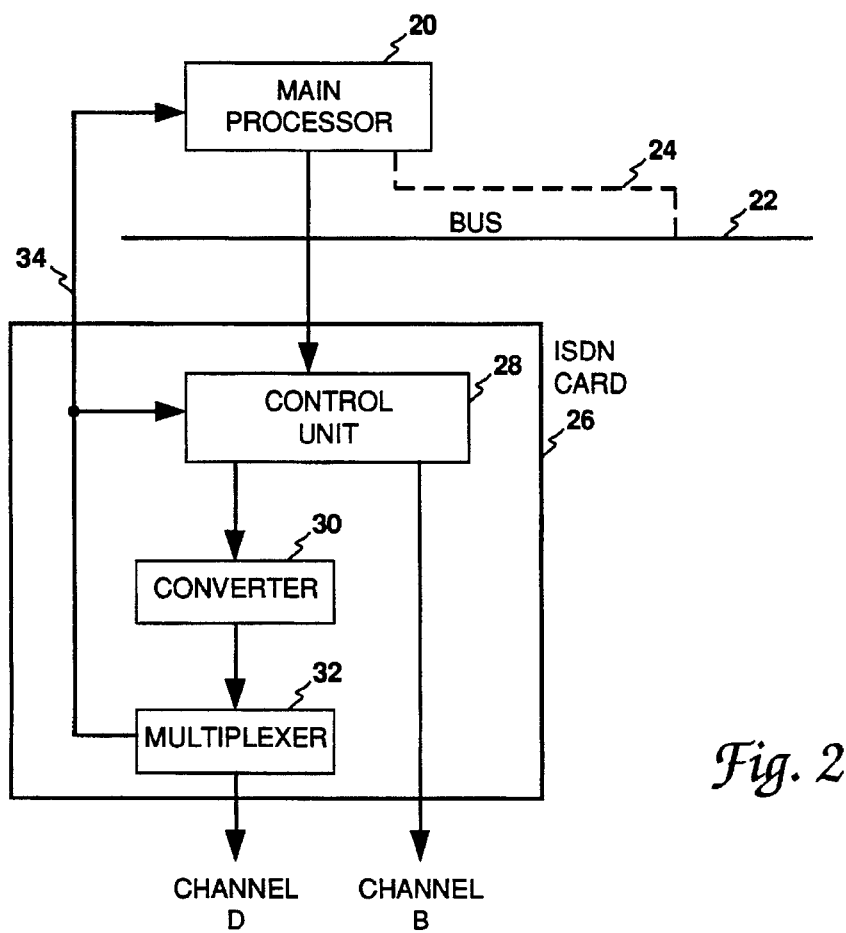
FIG. 2 is a simplified block diagram of a computer system for implementing the conversion method of the invention.

FIG. 2 shows a PS/2 personal computer having a main processor 20 connected via a bus 22 to an ISDN card 26. The ISDN card has its own processor and memory. The main processor on the PS/2 runs an X.25 application program, thereby effectively acting as the X.25 terminal of FIG. 1, whilst the bus takes the place of the physical X.25 connection and the card performs the function of the terminal adapter. The processor can also be used for true ISDN applications which run simultaneously with the X.25 application. Originally an X.25 card would have been provided via dotted line connection 24 for running the X.25 application program, but this would require two separate cards and the rental of both an ISDN and an X.25 line.

LAPB frames from the X.25 application program running on the PS/2 are received by the control unit 28 on the ISDN card via the bus 22. The control unit can then transmit these either on the ISDN B-channel, in which case no format conversion is necessary, or alternatively on the ISDN D-channel. In the latter case, the LAPB frames are passed through a converter 30, which could be implemented either in software or as a special purpose chip, to the multiplexer 32 which is responsible for combining/separating all the logical links on the D-channel. Signalling information is conveyed between the mulitplexer and the control unit and PS/2 processor by line 34. After passing through the multiplexer, the LAPD frames would be processed by a HDLC chip (not shown) for adding flag fields and CRC checks before transmission. The processing of the HDLC chip is not relevant to the present invention. Operation of the PS/2 as a receiving terminal is essentially the same as that for transmission, except that an incoming frame would obviously traverse the multiplexer, converter, control unit etc in reverse order. It should be appreciated that FIG. 2 is schematic only, and does necessarily reflect the configuration of an actual multi-layer ISDN system. Furthermore, the split of function between the adapter and the PS/2 can be varied, and indeed some adapters can operate without the need for a separate processor.

For transmission, the converter 30 receives whole frames from the control unit (or more accurately, the ISDN layer corresponding to the converter receives whole frames from a higher layer of the same ISDN system), as well as information specifying the number of octets (bytes) in the frame. Likewise, although data is first received at a terminal from the transmission line as a stream of bits, these are assembled into frames by a lower ISDN layer before reaching the converter. Again, the converter receives information specifying the number of octets in each frame.

A LAPB frame and a LAPD frame each comprises three concatenated fields:

|  | LAPB | LAPD |
| --- | --- | --- |
| i) An address field: | one octet | two octets |
| ii) A control field: | one or two octets | one or two octets |
| iii) An information field: (if information frame) | variable length | variable length |

(as mentioned above there are also flag fields etc, but these are not relevant for the purposes of the present invention). The conversion process between these two formats will now be described in detail.

1) LAPB to LAPD conversion

The converter receives LAPB frames and discards (i.e. treats as invalid) any input frames which are shorter than two octets. This prevents the conversion process trying to locate a control field that is not present. Discarding without notification is standard in X.25, because each frame is assigned a sequence number. Therefore a subsequent transmitting stage or the receiving station can detect any missing or discarded frames and request that they be retransmitted, or take any other appropriate action.

The first octet of a valid input frame is interpreted as the address field, and must contain one of the two values shown in FIG. 3. The whole byte is checked, and if the field contains neither of these values, the frame is regarded as invalid and discarded. An alternative strategy would be simply to examine the value of bit 2 to see whether it was 0 or 1, corresponding to a COMMAND or RESPONSE. The structure of an output LAPD address field is shown in FIG. 4, where EA is the Address field extension bit, C/R is the Command/Response field bit, SAPI is the service access point identifier, and TEI is the terminal endpoint identifier. An output LAPD address field is constructed from the LAPB address field as follows: a) The EA bit in the first octet (bit 1) is set to 0 and the EA bit in the second octet (bit 9) is set to 1; b) The C/R bit is set according to the address field value of the input LAPB frame. If the input address field contains the command bit pattern, C/R is set to zero; otherwise, C/R is set to one. c) The SAPI value is set to 16. One D-channel is capable of providing multiple logical links and the SAPI value is used to distinguish between them=for example, SAPI=0 is used to indicate signalling. SAPI=16 is the value specified by X.31 for X.25 communication over the D-channel. d) The TEI value is used to identify the terminal and is set to the value currently in use by the terminal adapter for X.25 on the D-channel. This value is stored in the PS/2 and is usually obtained from the ISDN provider either dynamically or at initial connection to the network.

The second octet of the input LAPB frame is interpreted as the first octet of a one or two-octet control field. The layout of a modulo 128 LAPB control field is shown in FIG. 5—the format of the control field in a modulo 128 LAPD frame is identical. In FIG. 5, N(S) is the Transmitter send sequence number, N(R) is the Transmitter receive sequence number, S is the Supervisory function bit, M is the modified function bit, X is Reserved and set to 0, P/F is a Poll bit when used as a command, or a final bit when used as a response; and P is a poll bit. There are three possible formats for the control field: I, S, or U (standing for information, supervisory and unnumbered). The conversion process examines the first two bits of the input control field (bits 1 and 2) to determine whether the control field has one octet or two octets. This checking is performed at the bit level because unlike with the address field, the first byte of the control field is not limited to a small number of predetermined patterns. If both bits are 1, the field is only one octet long, otherwise it is two octets long. If the conversion process indicates that the control field length is two octets, yet the total length of the frame is only two octets, then the frame is regarded as invalid and discarded. Otherwise, the control field is copied directly to the output control field of the output LAPD frame.

If the input LAPB frame is longer than three octets, then the fourth octet up to and including the last octet are interpreted as the information field. This is because a valid information field can only start at the fourth octet, following a one-octet address field, and a two-octet I-format control field. The information field of the fourth octet and beyond are copied directly to the output LAPD frame without performing any checks.

Figure 7:
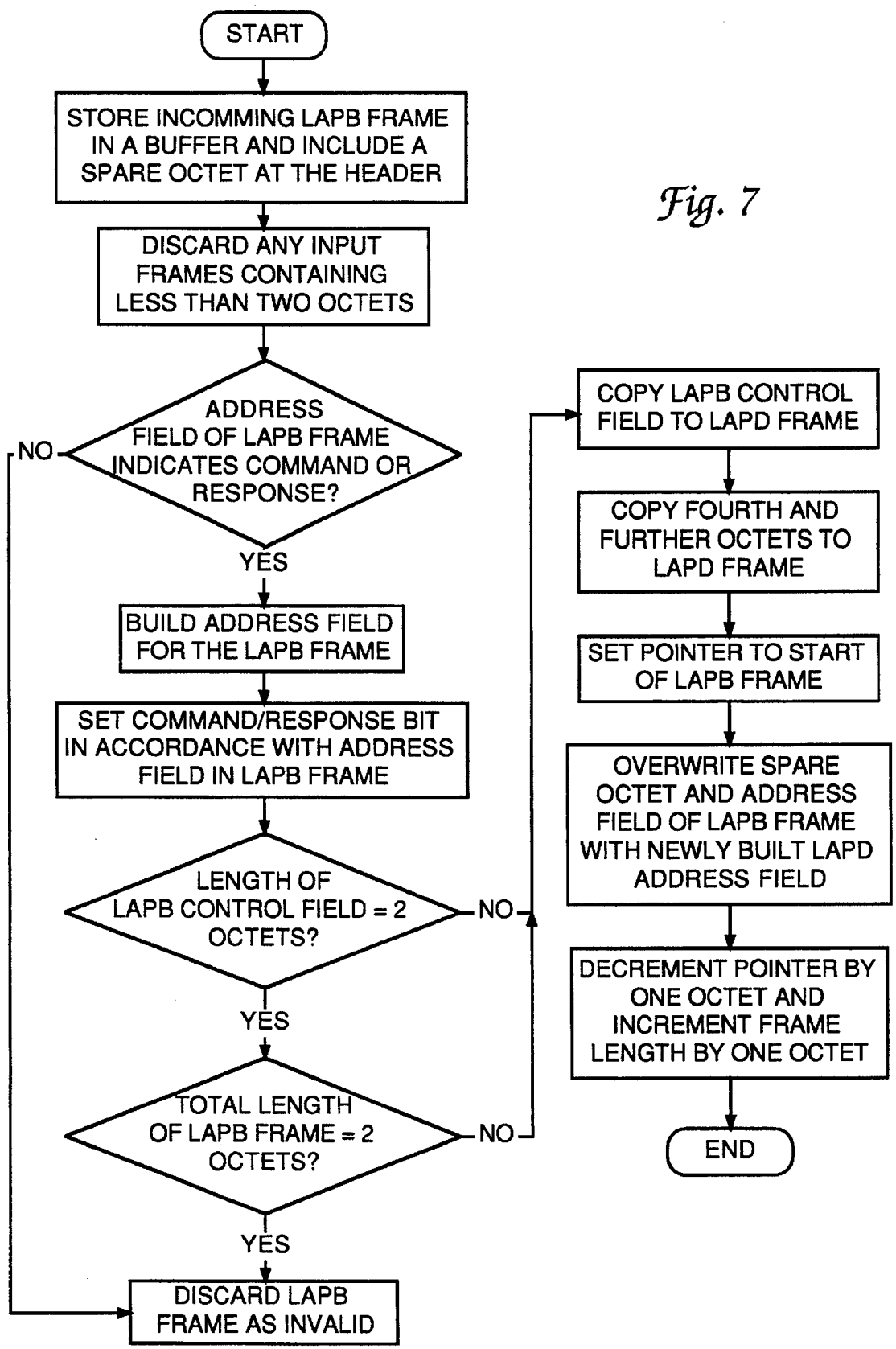
FIG. 7 is a high-level logic flowchart which illustrates the process of converting an LAPB frame to an LAPD frame in accordance with the method and system of the present invention.

FIG. 7 is a high-level logic flowchart which illustrates the process of converting an LAPB frame to a LAPD frame in accordance with the method and system of the present invention.

2) LAPD to LAPB conversion

The frame converter builds one LAPB frame from each input LAPD frame. The converter receives LAPD frames and discards (i.e. treats as invalid) any input frames which are shorter than three octets, again to prevent the conversion process trying to locate a control field that is not present. The first two octets of the input LAPD frame are interpreted as the address field. The C/R bit in the LAPD address determines the content of the LAPB address field if the C/R bit is 0, then the LAPB address is set to the bit pattern for a LAPB command, otherwise the LAPB address is set to the bit pattern for a LAPB response. All other input bits remain unexamined.

The third octet of the input LAPD frame is interpreted as the first octet of a one or two octet control field. The control field is converted from LAPD to LAPB in essentially the same way as a LAPB control field is converted to LAPD, as previously described. Thus the third octet of the input LAPD frame is interpreted as the first octet of a one or two-octet control field. The conversion process examines the first two bits of the input control field (bits 1 and 2) to determine the length of the control field. If both bits are 1, the field only one octet long, otherwise it is two octets long. If the conversion process indicates that the control field length is two octets, yet the total length of the frame is only three octets, then the frame is regarded as invalid and discarded. Otherwise, the control field is copied directly to the output control field of the LAPD frame.

If the input LAPD frame is longer than four octets, then the fifth octet up to and including the last octet are interpreted as the information field. This is because a valid information field can only start at the fifth octet, following a two-octet address field, and a two-octet I-format control field. The information field of the fifth octet and beyond are copied directly to the output LAPB frame without performing any checks.

An implementation of the conversion process is illustrated in FIG. 6. To convert a LAPB frame into a LAPD frame, the incoming LAPB frame is read into a buffer, with a spare octet (S) at its header, as shown in FIG. 6A. A pointer 50 indicates the start of the frame, and as noted above the length of the frame is also available (not shown). The conversion process builds the new two-byte address field by overwriting the spare octet and the original address octet (S and A). The pointer 50 is then decremented by one byte (i.e. to the location originally occupied by the spare octet), and the length of the frame correspondingly incremented by one byte, to obtain the converted LAPD frame.

FIG. 6B illustrates the reverse conversion process, from LAPD back to LAPB. In this case the incoming LAPD frame can be read into the buffer, with no need for a spare octet in the header. The pointer 50 again points to the start of the frame. When the one-byte LAPB address field is constructed, this overwrites the second octet of the LAPD address field (A2). The octet A1 is no longer required. The pointer 50 is therefore incremented by one byte (to the location originally occupied by A2), and the length of the frame correspondingly decremented by one byte, to obtain the converted LAPB frame.

Figure 8:
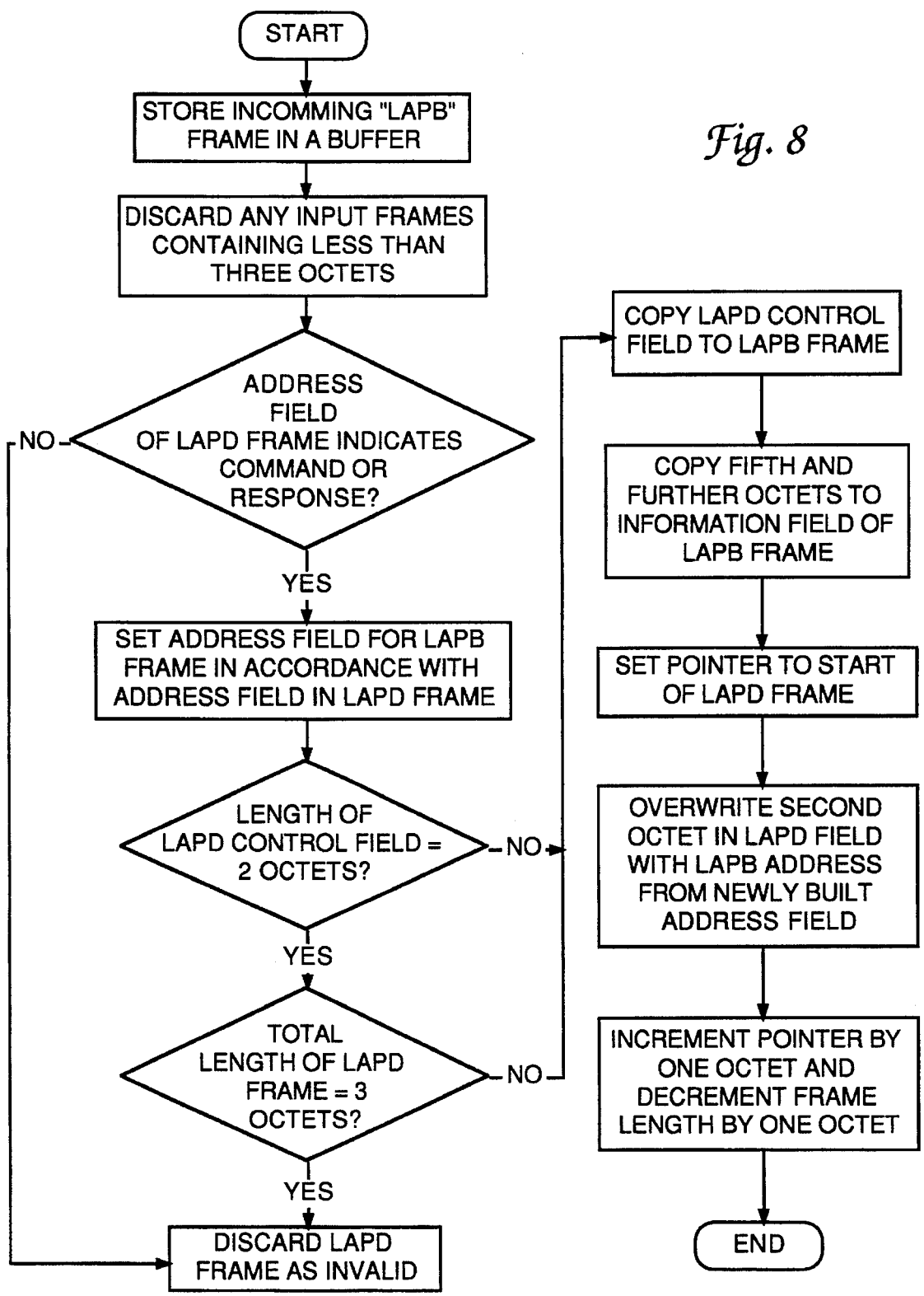
FIG. 8 is a high-level logic flowchart which illustrates the process of converting an LAPD frame to an LAPB frame in accordance with the method and system of the present invention.

FIG. 8 is a high-level logic flowchart which illustrates the process of converting an LAPD frame to a LAPB frame in accordance with the method and system of the present invention.

The process described above has been developed for modulo 128 format X.25, but could be extended to modulo 8 (essentially the modulo number refers to the cycle length of the number referred to above that identifies the position of an X.25 frame in a sequence of frames). Likewise, the process could also be applied to X.25 multi-link systems, in which multiple X.25 physical links are combined to provide a single logical X.25 of increased bandwidth.

What is claimed is:

1. A method of converting an ISDN LAPB frame to an ISDN LAPD frame comprising the steps of:

determining a frame length of the ISDN LAPB frame;

discarding any ISDN LAPB frames having a frame length less than two octets;

examining an address field of the ISDN LAPB frame to determine whether it is a, COMMAND or RESPONSE;

building an LAPD address field for the ISDN LAPD frame, and setting a COMMAND/RESPONSE bit in accordance with the address field of the ISDN LAPB frame;

examining a control field of the ISDN LAPB frame to determine the length of the control field, and discarding the ISDN LAPB frame if the determined length of the control field is two octets and the total length of the ISDN LAPB frame is two octets, else copying the control field directly from the ISDN LAPB frame to the ISDN LAPD frame; and copying a fourth and any further octets directly into an information field of the ISDN LAPD frame.

2. The method of claim 1, further comprising the step of discarding the ISDN LAPB frame as invalid if in the step of examining the address field of the LAPB frame, the address field does not match a pattern for either a RESPONSE or a COMMAND.

3. The method of claim 1 or 2, wherein the length of the control field is determined by examining the first two bits of the control field.

4. The method of claim 1 further comprising the steps of:

storing the ISDN LAPB frame in a buffer, and pointing a pointer to the start of the ISDN LAPB frame and adding a spare octet at the header of the ISDN LAPB frame;

overwriting the spare octet and the address field of the ISDN LAPB frame with the LAPD address field from said building step;

decrementing said pointer by one octet; and incrementing the length of the ISDN LAPB frame by one octet.

5. A method of converting an ISDN LAPD frame to an ISDN LAPB frame comprising the steps of:

determining a frame length of the ISDN LAPD frame:

discarding any ISDN LAPD frames having a frame length less than three octets;

examining an address field of the ISDN LAPD frame to determine whether it is a COMMAND or RESPONSE;

building an LAPB address field for the ISDN LAPB frame, and setting an LAPB address field for the LAPB frame to the COMMAND or RESPONSE value in accordance with the address field of the ISDN LAPD frame;

examining a control field of the LAPD frame to determine the length of the control field, and discarding the ISDN LAPD frame if the determined length of the control field is two octets and the total length of the ISDN LAPD frame is three octets, else copying the control field directly from the ISDN LAPD frame to the ISDN LAPB frame; and copying a fifth and any further octets directly into an information field of the ISDN LAPB frame.

6. The method of claim 5, wherein the length of the control field is determined by examining the first two bits of the control field.

7. The method of claim 5 or 6, further comprising the steps of:

storing the ISDN LAPD frame in a buffer, and pointing a pointer to the start of the ISDN LAPD frame;

overwriting a second octet in the address field of the ISDN

LAPD frame with the ISDN LAPB address field from said building step; and incrementing said pointer by one octet and decrementing the length of the ISDN LAPD frame by one octet.

8. A system for converting an ISDN LAPB frame to an ISDN LAPD frame comprising:

means for determining a frame length of the ISDN LAPB frame;

means for discarding any ISDN LAPB frames having a frame length less than two octets;

means for examining an address field of the ISDN LAPB frame to determine whether it is a COMMAND or RESPONSE;

means for building an LAPD address field for the LAPD frame, and means for setting a COMMAND/RESPONSE bit in accordance with the address field of the ISDN LAPB frame;

means for examining a control field of the ISDN LAPB frame to determine the length of the control field, and discarding the ISDN LAPB frame if the determined length of the control field is two octets and the total length of the ISDN LAPB frame is two octets;

means for copying the control field directly from the ISDN LAPB frame to the ISDN LAPD frame; and means for copying a fourth and any further octets directly into an information field of the ISDN LAPD frame.

9. The system of claim 8, further comprising:

a buffer for storing the ISDN LAPB frame, with a pointer for pointing to the start of the ISDN LAPB frame and a spare octet at the header of the ISDN LAPB frame;

means for overwriting the spare octet and the address field of the ISDN LAPB frame with the LAPD address field; and means for decrementing said pointer by one octet; and means for incrementing the length of the ISDN LAPB frame by one octet.

10. A system for converting an ISDN LAPD frame to an ISDN LAPB frame comprising:

means for determining a frame length Of the ISDN LAPD frame;

means for discarding any ISDN LAPD frames having a frame length less than three octets;

means for examining an address field of the ISDN LAPD frame to determine whether it is a COMMAND or RESPONSE;

means for setting the address field for the ISDN LAPB frame to a COMMAND or RESPONSE value in accordance with the address field of the ISDN LAPD frame;

means for examining a control field of the ISDN LAPD frame to determine the length of the control field, and discarding the ISDN LAPD frame if the determined length of the control field is two octets and the total length of the ISDN LAPD frame is three octets;

means for copying the control field directly from the ISDN LAPD frame to the ISDN LAPB frame; and means for copying a fifth and any further octets directly into a information field of the ISDN LAPB frame.

11. The system of claim 10, further comprising:

a buffer for storing the ISDN LAPD frame, with a pointer for pointing to the start of the ISDN LAPD frame;

means for overwriting a second octet in the address field of the ISDN LAPD frame with the ISDN LAPB address field; and means for incrementing said pointer by one octet and means for decrementing the length of the ISDN LAPD frame by one octet.

* * * * *